United States Patent Office 2,958,705
Patented Nov. 1, 1960

2,958,705 p-METHOXYPHENYL 3,4-DICHLOROBENZOATE

David A. Gordon and John M. Corbett, Midland, Mich., assignors to The Dow Chemical Company, Midland, Mich., a corporation of Delaware No Drawing. Filed Sept. 3, 1958, Ser. No. 758,671

1 Claim. (Cl. 260—476)

The present invention is directed to the novel compound p-methoxyphenyl 3,4-dichlorobenzoate, and to a method for its preparation. The present compound corresponds to the formula

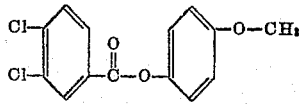

This compound is a crystalline solid soluble in many common organic solvents, such as the lower alkanols, acetone, and the light petroleum fractions and of very low solubility in water. It is useful as a parasiticide, as an insecticide for the control of houseflies and cockroaches, and as a herbicide.

The novel compound may be prepared by reacting p-methoxyphenol with 3,4-dichlorobenzoyl chloride. Conveniently, the reaction is carried out in inert liquid reaction medium which is preferably water. Good results are obtained when employing the dichlorobenzoyl chloride reactant in an amount approximately equimolecular with the methoxyphenol reactant. Preferably, the reaction is carried out in the presence of a hydrogen chloride neutralizing agent, which may be a tertiary amine such as pyridine, or an alkali metal lower alkoxide, or carbonate, or preferably, hydroxide. Hydrogen chloride of reaction is formed, and appears in the reaction mixture as product of reaction with such neutralizing agent. The reaction is exothermic, and takes place smoothly at temperatures of from 10° to 50° C.

In carrying out the reaction, the 3,4-dichlorobenzoyl chloride reactant is added slowly, portionwise, and with stirring to a mixture of the p-methoxyphenol and hydrogen chloride neutralizing agent which may be sodium hydroxide intimately mixed and blended together in water as reaction medium, in a reaction flask which is chilled in an ice bath. Upon completion of the combining of the reactants, stirring and cooling are continued for an additional period of time to carry the reaction to completion. Upon completion of the reaction, the desired product may be separated and purified in known manners. In one such manner, the reaction mixture is filtered, the residue water-washed, and recrystallized from a lower alkanol which may be ethanol.

The following example illustrates the present invention but is not to be considered as limiting it.

Example 3,4-dichlorobenzoyl chloride (800 grams; 3.8 moles) was added slowly, portionwise, and with stirring over a period of time to a mixture of 500 grams (4.0 moles) of p-methoxyphenol and 180 grams (4.5 moles) sodium hydroxide dispersed in water, contained in a reaction flask immersed in ice bath. Upon completion of the combining of the reactants, stirring was continued for an additional 4.5 hours to carry the reaction to completion. At the end of this time, the reaction mixture was filtered, the product residue water-washed, air dried, and recrystallized from ethanol. As a result of these operations there was obtained a p-methoxyphenyl 3,4-dichlorobenzoate product readily soluble in hot lower alkanols, as a colorless crystalline solid melting at 109°–110° C.

The present compound is useful as parasiticide, and is especially adapted in the control of the spread of intestinal parasites of warm blooded animals. For such use, the compound may be dispersed upon an inert finely divided solid and the resulting preparation employed as a dust. Also, such preparation may be dispersed in water with or without the aid of a wetting agent, and the resulting aqueous dispersion employed as sprays. In other procedures the compound may be employed in solvent or as a constituent of solvent-in-water or water-solvent emulsions or aqueous dispersion thereof which may be applied as spray, drench, or wash. In a representative operation, p-methoxyphenyl 3,4-dichlorobenzoate was dissolved in acetone to prepare a 1 percent by weight solution. This solution was mixed with fresh calf feces heavily infested with ova of many Helminth species including cooperia, trichostrongylus, esophagostomum, and bunostomum, as well as the individual species Haemonchus contortus and Ostertagia ostertagia, to prepare treated cultures containing 300 parts by weight of the dichlorobenzoate compound per million parts by weight of total composition including fecal material. Portions of this culture were incubated at a temperature of 27° C. for a period of 5 days. A check culture containing similarly infested and treated material without the present p-methoxyphenyl 3,4-dichlorobenzoate as toxicant were similarly incubated. Following the incubation period, the cultures were examined microscopically to determine the presence or absence of the larvae of the named Helminth species and treated cultures compared with the untreated checks to determine the percent control of the larvae. Moreover, the tests were replicated, employing different fecal specimens, to provide further verification of the results. As a result of the treatment of the fecal specimens with the present compound, no live larvae of the named Helminth parasites were found, whereas the untreated checks were found to be heavily infested with the larvae of the named Helminths.

Various modifications of the process and products of the present invention may be made without departing from the spirit or scope thereof, and it is to be understood that we limit ourselves only as defined in the appended claim.

We claim:
p-Methoxyphenyl 3,4-dichlorobenzoate.

References Cited in the file of this patent

UNITED STATES PATENTS

| | | |
|---|---|---|
| 2,665,301 | Monroe et al. | Jan. 5, 1954 |
| 2,666,039 | Reid et al. | Jan. 12, 1954 |